(12) United States Patent
Craig

(10) Patent No.: US 6,811,359 B2
(45) Date of Patent: Nov. 2, 2004

(54) TRUE HELICAL CUTTER SYSTEM

(75) Inventor: Karen A. Craig, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/161,489

(22) Filed: May 31, 2002

(65) Prior Publication Data

US 2003/0223828 A1 Dec. 4, 2003

(51) Int. Cl.[7] .............................. B26D 1/12; B26D 1/00
(52) U.S. Cl. ........................................ 407/35; 407/113
(58) Field of Search .................... 407/34, 35, 40, 407/42, 43, 48, 56, 61, 62, 63, 113

(56) References Cited

U.S. PATENT DOCUMENTS

| | | | |
|---|---|---|---|
| 3,715,788 A | * | 2/1973 | Ayer ............................ 407/37 |
| 3,861,011 A | * | 1/1975 | Nose et al. .................... 407/11 |
| 4,618,296 A | * | 10/1986 | Allaire et al. .................. 407/42 |
| 4,714,383 A | * | 12/1987 | Shimomura et al. .......... 407/42 |
| 4,790,693 A | | 12/1988 | Koblesky ...................... 407/35 |
| 4,812,087 A | | 3/1989 | Stashko ........................ 407/42 |
| 4,838,739 A | | 6/1989 | Stashko ........................ 407/42 |
| 4,898,500 A | * | 2/1990 | Nakamura et al. ............ 407/62 |
| 4,936,361 A | * | 6/1990 | Mercier et al. ............. 144/221 |
| 5,083,887 A | * | 1/1992 | Dotany ......................... 407/59 |
| 5,244,318 A | * | 9/1993 | Arai et al. ..................... 407/42 |
| 5,586,843 A | | 12/1996 | Minicozzi ..................... 407/42 |
| 5,913,644 A | | 6/1999 | DeRoche et al. ............. 407/42 |
| 5,944,456 A | | 8/1999 | Shirley et al. ................ 407/42 |
| 5,947,650 A | | 9/1999 | Satran et al. ............... 407/113 |
| 6,053,672 A | | 4/2000 | Satran et al. ................. 407/40 |
| 6,171,031 B1 | * | 1/2001 | LaFlamme ................... 407/113 |
| 6,196,770 B1 | | 3/2001 | Astrom et al. ................ 407/40 |
| 6,224,299 B1 | * | 5/2001 | Frecska et al. ............... 407/41 |

* cited by examiner

Primary Examiner—A. L. Wellington
Assistant Examiner—Brian D. Walsh
(74) Attorney, Agent, or Firm—Larry R. Meenan

(57) ABSTRACT

A cutter system that is designed to create a continuous cutting true helix while having true helical inserts that are indexable on at least two cutting edges. The shape of the insert allows an interlocking overlap of the cutting edges for an all effective true helical cut. The helix ground into the insert faces creates a smooth cutting action as a solid helical endmill. High positive radial and axial rakes enable free cutting machining with a fine finish and low horsepower consumption. The back of the insert has a diamond shaped island that is used for locating the insert in the mounting pocket of the cutter and is used for face contact on lockup when the insert screw is tightened. The mounting pocket is designed for ease of manufacture to limit tolerance buildup to ensure repeatable insert positioning and to maintain accuracy for a fine cutting finish. The insert screw hole is placed in the cross hole location for allowing an unobstructed cutting face and a larger diameter center core in the cutter body. The larger core creates maximum strength and allows longer cutting lengths. Prior to grinding, the insert blank can be used for multiple diameters of cutters. After grinding the insert blank, the inserts are made specific to the cutting diameter for which they were ground or a compromised grind may be employed for use with multiple cutting diameters.

17 Claims, 6 Drawing Sheets

TRUE HELICAL CUTTER SYSTEM

CROSS-NOTING TO RELATED APPLICATIONS

This application is related to U.S. application Ser. No. 10/160,488, entitled Helical Insert and Cutter Bodies (K-1867), filed on May 31, 2002, the entire contents of which are herein incorporated by reference.

BACKGROUND OF THE INVENTION

1. Field of the Invention

The present invention relates to milling cutters and cutting inserts used thereon, and in particular to a true helical cutter system that includes a milling cutter with true helical indexable cutting inserts that creates a continuous true helical cut.

2. Description of the Related Art

One of the current concerns in milling is the stepped or wavy surface on the milled surface, specifically in the areas of face and end milling. This stepped, uneven or otherwise irregular finish is typically a result of the type, position and location of the cutting inserts. This stepping is particularly relevant in attempts at all-in-one mills, that is mills capable of three dimensional milling, including plunging, ramping, circle interpolating, facing, and end milling with the same mill.

Cutting inserts that are not properly aligned along the flutes of the mill will provide such stepping. For example, on helical mills the inserts must be aligned to follow the curved contour of the helix and any misalignment results in stepping or other irregular finish such as a groove or lip where one insert is radially outward further than adjacent inserts. In addition, cutting inserts that have substantially rectangular configurations (that is, with long, flat cutting edges) will provide such stepping. This stepping is caused by the rectangular configuration of the insert removing excessive material from the workpiece at or approaching the corners of the inserts thereby causing stepping. In contrast, cutting inserts that have an arc-like periphery along its entire cutting surface (radiused corners that extend across the whole cutting edge) remove excess material from the workpiece along the mid-section of the cutting insert, thereby causing valleys.

It is believed that this stepped surface is often unacceptable, particularly when a finished, as opposed to a rough surface is desired. This stepping is unacceptable because stress points typically form at the inner and outer edges of the steps as these edges are often well defined. This forces the milling user to thereafter finish mill the surface that is an additional time consuming and expense-adding step.

Such improvement in milling continues to be sought in various industries because such reduction or complete elimination of all stepping and waviness will increase the overall life of the metal end product by reducing and/or eliminating stress, fatigue and other undesirable forces working against the metal end product. In conjunction with this, if a milling cutter could perform all or substantially all of the typical milling steps including ramping, plunging, circle interpolation, facing and end milling, then significant cost and time reduction would also be achieved. Finally, if all such milling steps could be achieved by one milling cutter, it is desirable that the milling cutter still have a reasonable life even though these various steps involve different concerns and factors including the subjecting of the cutter to large axial, radial, and tangential forces, possibly simultaneously.

The inventor of the present invention has recognized these and other problems and has developed a true helix cutting system in which the helically arranged cutting inserts provide a true helical cutting edge to the workpiece, resulting in an improved cutting action that reduces or completely eliminates all stepping and waviness in the workpiece.

SUMMARY OF THE INVENTION

The present invention relates to an improved milling cutting system that is designed to create a continuous cutting true helix while having true helical inserts that are indexable on two cutting edges by rotating the insert by 180 degrees.

The present invention comprises a true helical cutter system that includes a milling body having a plurality of mounting pockets and a plurality of cutting inserts mounted to the mounting pockets of the milling body. Each cutting insert includes front and back faces, at least two opposing side walls, at least one cutting edge defined at an intersection between the front face and the combination of one of the side walls, wherein the front face of each insert is radiused to create a true helical insert.

In one aspect of the invention, at least one of the side walls of each insert includes a notched face for allowing each of the cutting inserts that are grouped into a helically attached group to interlock with one another.

In another aspect of the invention, at least one of the side walls of each insert include a helical cut face to form a side face helix that creates a smooth cutting action as a solid helical end mill.

Various aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
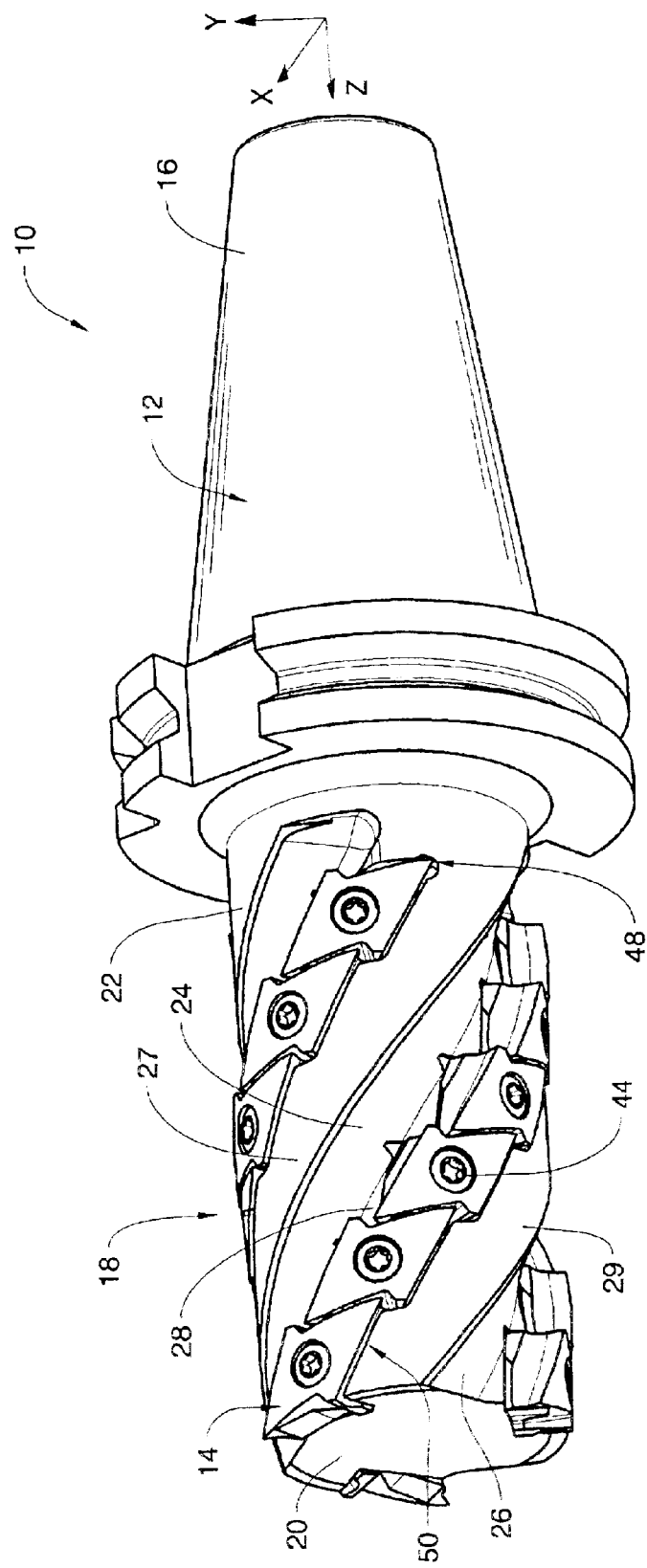
FIG. 1 is an isometric view of a helical end mill cutter with improved cutting inserts according to an embodiment of the invention.

Referring now to FIG. 1, an improved cutter system, shown generally at 10, includes a milling cutter body 12 with improved cutting inserts 14 that are designed to create a continuous cutting true helix while having true helix inserts that are indexable on at least two cutting edges. The milling cutter body 12 is embodied as a helical end mill which includes the plurality of general milling inserts 14 for ramping, circle interpolating, facing and end milling. Although the improved cutting inserts 14 are shown in a helical end mill embodiment, the improved cuttings inserts 14 are designed for use in any type of milling, such as shell milling. In addition, several of the concepts described below on the helical mill including overlapping inserts by offsetting, staggering or other methods are also designed for use on other types of mills.

The milling cutter body 12 is of an elongated and generally cylindrical shape. The milling cutter body 12 comprises a shank 16 and a head 18. The shank 16 is configured so as to be capable of insertion and securing within the spindle of a milling machine (not shown) as is well known in the art. The shank 16 may be of any shape or design so as to be capable of this insertion and securing. Such designs include, but are not limited to, V-flange, taper, shell mill mount, and Weldon shank.

The head 18 is generally a cylindrical or substantially cylindrical body or shaft extending axially from the shank 16 to an end face 20, thereby defining an exterior surface 22 therebetween. The exterior surface 22 of the head 18 preferably includes a plurality of helical chip grooves 24 and 26. It will be appreciated that the invention is not limited by the number of helical chip grooves. For example, in the illustrated embodiment, the cutter system 10 includes a total of three helical chip grooves, although any number of helical grooves are contemplated by the invention. Each chip groove 24 and 26 is preferably cut into the exterior surface 22 in a helical or spiral manner that extends from the end face 20 to substantially the shank 16.

More specifically, each chip groove is disposed between a pair of opposing faces; specifically a leading face and a trailing face defining a carved out flute area on which a helical grouping of cutting inserts 14 can be mounted thereon. For example, in the illustrated embodiment, the chip groove 24 is preferably located between the trailing face 27 of helical grouping 48 and the leading face 28 of helical grouping 49. Similarly, the chip groove 26 is preferably located between the trailing face 29 of helical grouping 49 and the leading face 30 of helical grouping 50. Each leading face 28 and trailing face 30 spirals along the exterior surface 22 where each face 28 and 30 at any cross sectional point thereon is substantially radial to the central axis (in the direction of the z-axis) of the substantially cylindrical shank 16. Each insert 14 is preferably recessed into the trailing faces 27, 29 to provide clearance in the cut, as well as protecting the cutting edge of each insert 14 that is not being used from chipping or other damage.

Figure 2:
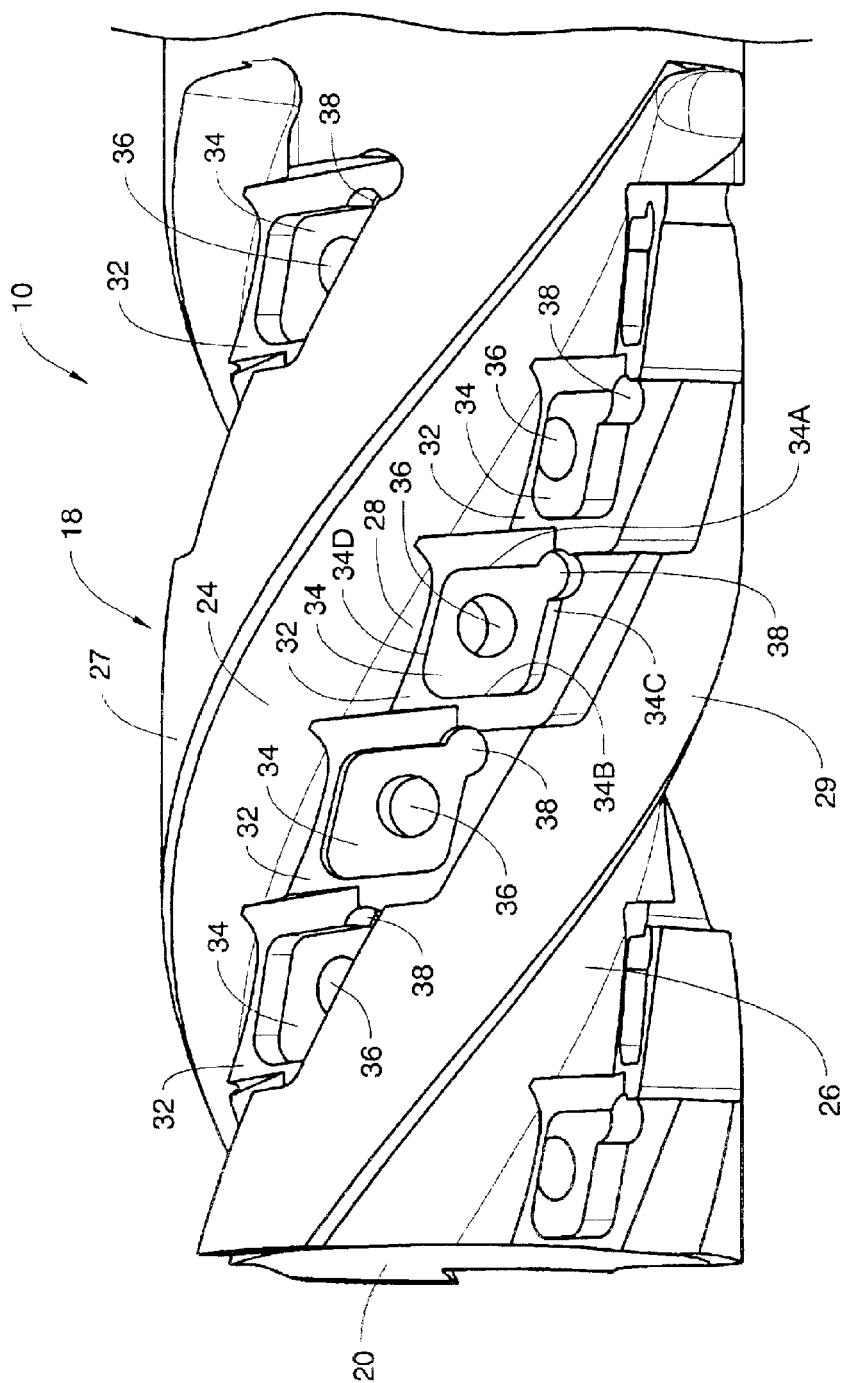
FIG. 2 is a side elevational view of the helical end mill cutter head with the cutting inserts removed.
Figure 3:
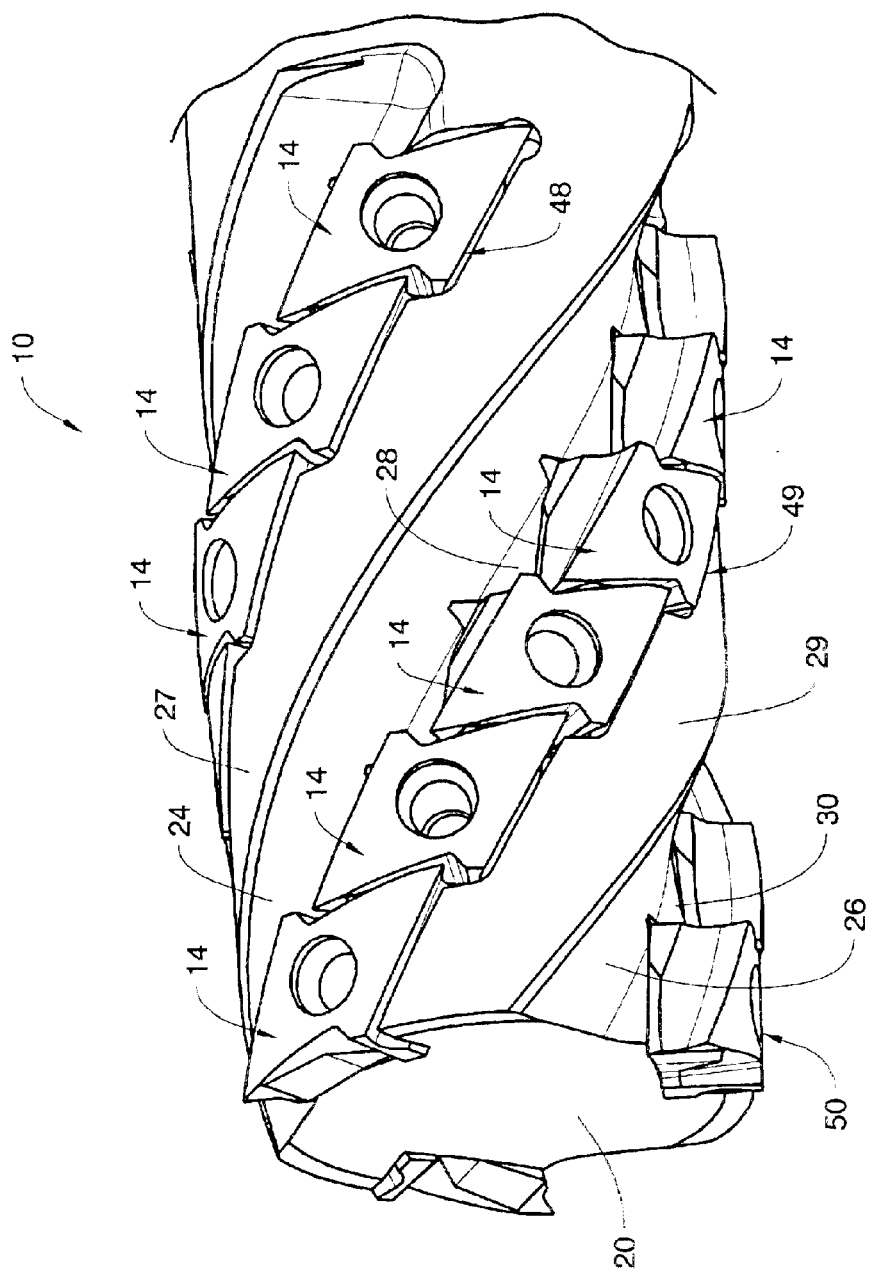
FIG. 3 is an isometric view of the helical end mill cutter head with the cutting inserts thereon.
Figure 4:
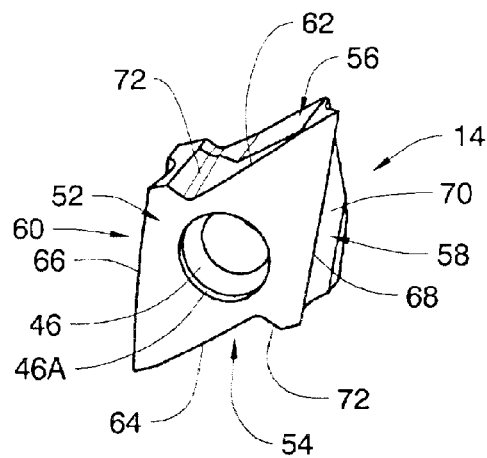
FIG. 4 is an isometric view of an improved cutting insert according to an embodiment of the invention.

As best shown in FIGS. 2 and 3, a plurality of pocket faces 32 are located between the leading faces and the trailing faces of each grouping of inserts, for example, between the leading face 28 and the trailing face 29 of grouping 49. Each pocket face 32 includes a recessed mounting pocket 34 with a threaded hole 36 therein. It should be noted that configuration of the mounting pocket 34 substantially conforms to the configuration of the insert 14, and in particular to the bottom of the insert 14. Thus, in the illustrated embodiment, opposed walls 34a and 34b of each mounting pocket 34 are generally parallel to each other. Each mounting pocket 34 also includes a back wall 34c and an opposed front wall 34d that are also generally parallel to each other to provide a three-point mounting system in which the cutting insert 14 positively engages the pocket face 32, the side wall 34a and the back wall 34c when the cutting insert 14 is positively secured within the mounting pocket 34. A relief 38 is located in one corner of each mounting pocket 34 formed by the side wall 34a and the back wall 34c to provide a locating surface and prevent the insert 14 from binding with the cutter head 18. If desirable, another relief 38 can be located in the other corner of the mounting pocket 34 formed by the side wall 34b and the back wall 34c.

Referring now to FIGS. 4–9, each pocket face 32 receives a cutting insert, such as insert 14. Specifically, on the back face 40 of each insert 14 is the corresponding complimentary integrally formed diamond-shaped locating island or mounting pad 42 that mates with the mounting pocket 34. The mounting pocket 34 and mounting pad 42 are designed for ease of manufacture to limit tolerance buildup, thereby ensuring repeatable insert positioning while maintaining accuracy and a fine cutting finish. After the mounting pad 42 is seated or mated in the mounting pocket 34, the insert 14 is tightly secured to the mounting pocket 34 by a locking fastener 44 (shown in FIG. 1), such as an Allen or Torx screw that passes through a clearance hole 46 located in the cross hole location of the cutting insert 14 and threads into the threaded hole 36. The clearance hole 46 includes a tapered counterbore 46A, which is engaged by a corresponding tapered surface on the head of the locking fastener 44, thereby allowing the insert to be tightly secured to the pocket face 32 as the locating fastener 44 pushes downward against the tapered counterbore 46A. The location of the clearance hole 46 in the cross hole location of the cutting insert 14 allows an unobstructed cutting face and a larger diameter center core in the cutter body 12, thereby creating maximum strength and allowing longer cutting lengths.

As described above and in accordance with one of the features of the invention, the inserts in adjacent groupings are staggered, that is in any given cross sectional plane through the shank 16, the inserts on the grouping 48 overlap and preferably start and end in the mid-section of one of the inserts in the adjacent grouping 50, as is best shown by the inserts toward the end face 20 in FIG. 1. Although this staggering may be of any overlap, it is preferred that the overlap is from substantially mid-point of an insert in grouping 48 or 50 with the spacer 38 adjacent another insert in the other grouping 48 or 50, respectively. In addition, it is preferable that the midpoint of any given insert is centered between the inserts in the adjacent helical grouping as this provides the best peak shaving on the milled surface. As shown in the illustrated embodiment, there is a one-to-one correspondence between the number of helical groupings and the number of flute areas. The measurement of effective flute areas or flutes can be determined by how many flutes need to pass in order to cut one complete profile on the workpiece. Because the groupings 48 and 50 overlap in the manner described above, only one flute (or grouping of inserts) is needed to cut one profile. Thus, in the illustrated embodiment, the three groupings or flute areas define a three effective flute cutter system, thereby providing a highly productive cutting configuration.

Figure 5:
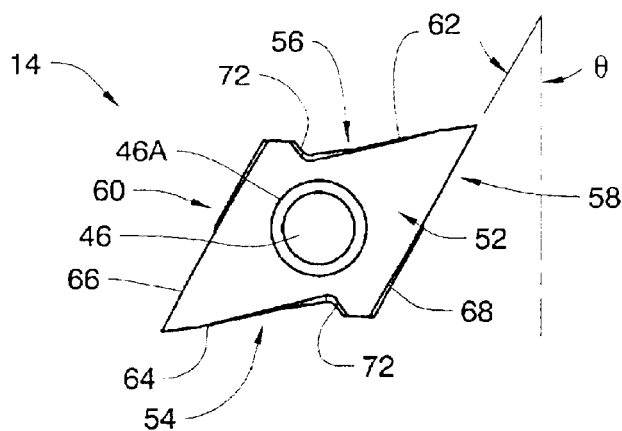
FIG. 5 is a top plan view of the cutting insert of FIG. 4.
Figure 6:
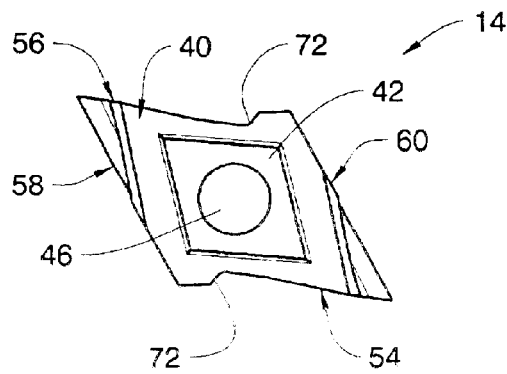
FIG. 6 is a bottom plan view of the cutting insert of FIG. 4.
Figure 7:
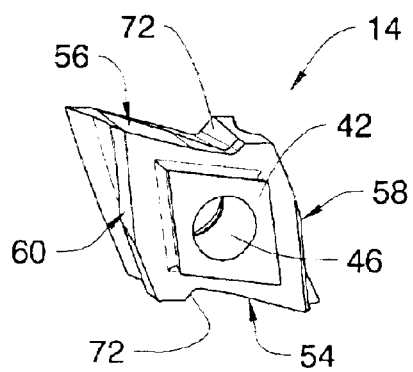
FIG. 7 is an isometric view of the bottom of the cutting insert of FIG. 4.
Figure 10:
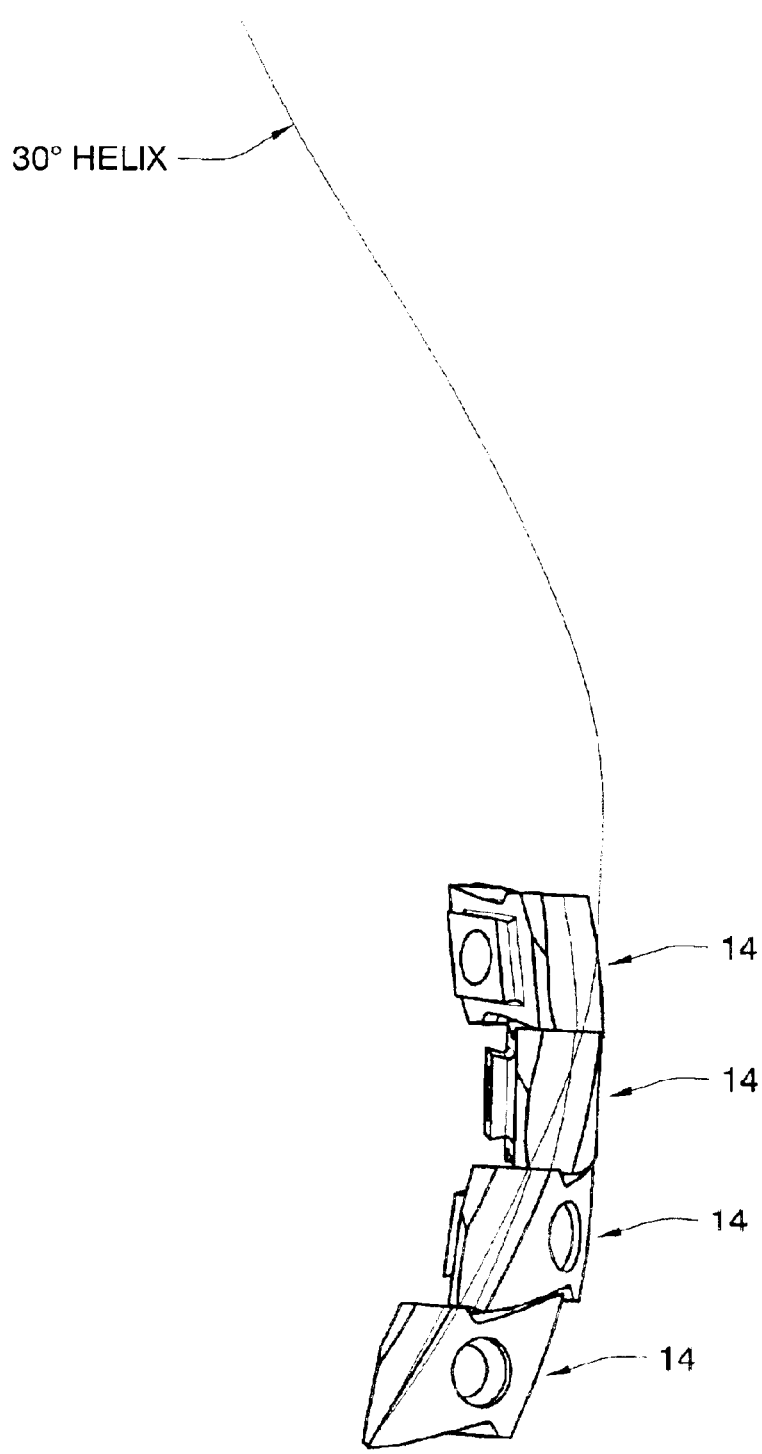
FIG. 10 is a diagram showing the true helix of the cutting inserts of the invention.

In the displayed embodiment of FIGS. 4–9, cutting insert 14 is approximately diamond in general shape and includes a front face or top surface 52, a pair of opposed side walls or surfaces 54 and 56, another pair of opposed side walls or surfaces 58 and 60, the base surface or back face 40, and the integrally formed mounting pad 42 extending outward from the base surface 40. Formed at the intersection between the top surface 52 and the side walls 54, 56, 58 and 60 are principally four edges, namely a pair of opposed and spaced apart edges 62 and 64, and another pair of opposed and spaced apart edges 66 and 68. At least one of the edges 62, 64, 66 and 68 is a cutting edge, and preferably at least the two opposite edges 66 and 68 are cutting edges, thereby allowing the insert to be indexable by rotating the cutting insert 14 by approximately 180 degrees. The edges 66 and 68 preferably form an angle, θ, of approximately 30° with the central, longitudinal axis of the cutter body 12 (along the z-axis) to cut a true 30° helix about the cutting diameter of the cutter 10, as shown in FIG. 10. Although only the edge 68 is shown in FIG. 5 to have an angle of approximately 30°, it should be realized that cutting edge 66 is substantially parallel to cutting edge 68, and thus will also have an angle of approximately 30°. It will be appreciated that the invention is not limited by the angle of the cutting edges, but the invention can be practiced with any desirable angle for the cutting edges. For example, other shapes of inserts are contemplated that include helical cuts in the side walls with an angle, θ, for the helix that ranges between 0° and 60°.

Figure 8:
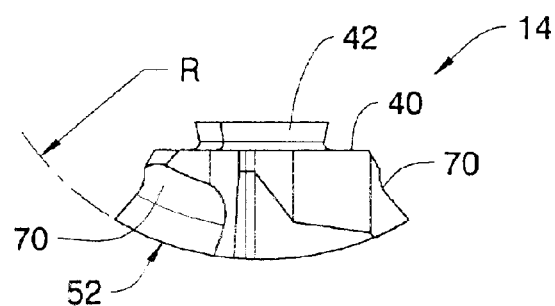
FIG. 8 is a side elevational view of the cutting insert of FIG. 4.
Figure 9:
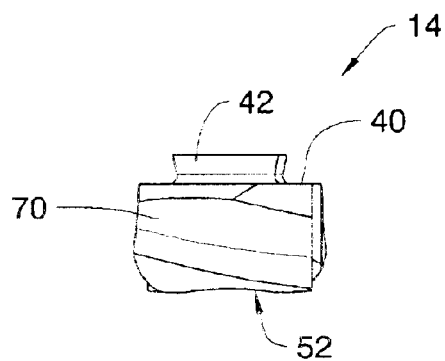
FIG. 9 is another side elevational view of the cutting insert of FIG. 4.

In accordance with another of feature of the invention, the top surface 52 of the insert 14 is formed as a rounded or radiused top surface having a radius, R, as best shown in FIG. 8. The intersection between the radiused top surface 52 and the side walls 58 and 60 provide true helical cutting edges 66 and 68 approximately the same as the cutting diameter, as shown in FIG. 10. In this manner, the radiused top surface 52 of the insert 14 in combination with the helical cut face 70 in the side walls 58 and 60 provides for a true helical cut that follows the curvature of the outer surface of the head 18, unlike conventional inserts with front faces or surfaces that are substantially flat.

In accordance with another of feature of the invention, the top surface 52 of the insert 14 is formed as a rounded or radiused top surface having a radius, R, as best shown in FIG. 8. Preferably, the radius, R, is approximately the same as the cutting diameter, as shown in FIG. 10. Preferably, the top surface 52 has a radius of curvature follows the curvature of the outer surface of the head 18. In this manner, the radiused top surface 52 of the insert 14 provides for a true helical cut that follows the curvature of the outer surface of the head 18, unlike conventional inserts with front faces or surfaces that are substantially flat.

As described above, the cutter system 10 of the invention is designed to create a continuous true helical cut. In addition, the cutter system 10 of the invention provides an indexable helical insert that is indexable on two cutting edges by rotating the insert 180 degrees. Thus, the cutter system 10 of the invention provides for a more cost-effective cutter system because indexing the insert maintains cutting diameter and edges, unlike scrapping the entire cutter when the cutting edge is worn or broken in a conventional solid endmill design.

It will be appreciated that the indexable cutting insert 14 of the present invention is not limited to the type of cutter body 12, and that the invention can be practiced with other types of cutter body designs. For example, the indexable cutting insert 14 of the present invention can be utilized in a shell end mill type of cutter body, a end mill type of cutter body, commonly known as a "router," or the like.

While the invention has been specifically described in connection with certain specific embodiments thereof, it is to be understood that this is by way of illustration and not of limitation, and the scope of the appended claims should be construed as broadly as the prior art will permit.

What is claimed is:

1. A helix cutter system, comprising:
   a milling body having a plurality of mounting pockets; and
   a plurality of indexable cutting inserts mounted to the mounting pockets of said milling body, at least one cutting insert including a front face having a helically radiused curvature, a back face including a mounting pad, and at least two opposing side walls that each include a helical cut face with respect to a central, longitudinal axis of the milling body, wherein a helical cutting edge is defined at an intersection between the front face and the two opposing side walls, and wherein the mounting pad is capable of being seated in one of the plurality of mounting pockets.

2. The cutter system of claim 1, wherein one of said side walls includes a notched face for allowing each of the cutting inserts that are grouped into a helically attached group to interlock with one another.

3. The cutter system of claim 1, wherein the front face has a radius of curvature approximately equal to a cutting diameter of the milling body.

4. The cutter system of claim 1, wherein at least one insert is generally diamond in shape.

5. The cutter system of claim 1, wherein said at least two opposing side walls has an angle in a range of approximately 0 to 60 degrees with respect to a central axis of the milling body.

6. The cutter system of claim 5, wherein the angle is approximately 30 degrees.

7. A helix cutter system, comprising:
   a milling body having a plurality of mounting pockets; and
   a plurality of indexable cutting inserts mounted to the mounting pockets of said milling body, at least one cutting insert including front having a helically radiused curvature, a back face including a mounting pad, at least two opposing side walls that each include a helical cut face with respect to a central, longitudinal axis of the milling body, wherein a helical cutting edge is defined at an intersection between the front face and the two opposing side walls, and wherein the mounting pad is capable of being seated in one of the plurality of mounting pockets, and wherein the helical cutting edge follows a cutting diameter of the milling body as the milling body rotates about the central axis.

8. The cutter system of claim 7, wherein one of said side walls includes a notched face for allowing each of the cutting inserts that are grouped into a helically attached group to interlock with one another.

9. The cutter system of claim 7, wherein at least one insert is generally diamond in shape.

10. The cutter system of claim 9, wherein said at least two opposing side walls has an angle in a range of approximately 0 to 60 degrees with respect to a central axis of the cutter body.

11. The cutter system of claim 10, wherein the angle is approximately 30 degrees.

12. An indexable insert for a cutter system, comprising:
    a front face having a helically radiused curvature;
    a back face including a mounting pad; and
    at least two opposing side walls that each include a helical cut face with respect to a central, longitudinal axis of a milling body when mounted thereon,
    wherein at least one cutting edge is defined at an intersection between said front face and the two opposing side walls, and
    wherein a helical cutting edge is defined at an intersection between the front face and the two opposing side walls.

13. The cutting insert of claim 12, wherein the cutting insert is generally diamond in shape.

14. The cutting insert of claim 13, wherein said at least two opposing side walls has an angle in a range of approximately 0 to 60 degrees with respect to a central axis of the cutter body.

15. The cutting insert of claim 14, wherein the angle is approximately 30 degrees.

16. The cutting insert of claim 12, wherein the cutting insert is mounted to a mounting pocket of the milling body.

17. The cutting insert of claim 16, wherein the cutting insert is mounted to the mounting pocket using a three-point mounting system.

* * * * *